United States Patent
Sakamoto

(10) Patent No.: US 9,993,899 B2
(45) Date of Patent: Jun. 12, 2018

(54) VEHICLE BODY MANUFACTURING APPARATUS

(71) Applicant: Fuji Jukogyo Kabushiki Kaisha, Tokyo (JP)

(72) Inventor: Noboru Sakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 14/845,125

(22) Filed: Sep. 3, 2015

(65) Prior Publication Data

US 2016/0067813 A1    Mar. 10, 2016

(30) Foreign Application Priority Data

Sep. 4, 2014    (JP) .................................. 2014-180548

(51) Int. Cl.
    *B23K 9/18*       (2006.01)
    *B23K 37/047*     (2006.01)
    (Continued)

(52) U.S. Cl.
    CPC ........ *B23K 37/047* (2013.01); *B23K 11/0026* (2013.01); *B23K 11/115* (2013.01);
    (Continued)

(58) Field of Classification Search
    CPC ....... B23K 11/11; B23K 11/10; B23K 11/115; B23K 11/314
    (Continued)

(56) References Cited

U.S. PATENT DOCUMENTS 5,548,096 A *  8/1996  Akasaka ............ B23K 37/0443
                                                219/108
6,193,142 B1 *  2/2001  Segawa ................ B23K 37/047
                                                219/127
(Continued)

FOREIGN PATENT DOCUMENTS

JP    H02-14984 A    1/1990
JP    H08-257762 A   10/1996
(Continued)

OTHER PUBLICATIONS

The English translation of Sakamoto (JP 2013-071173).*
JPO Notification of Reasons for Refusal dated Aug. 25, 2015 and Decision of Grant dated Jan. 19, 2016.

*Primary Examiner* — Dana Ross
*Assistant Examiner* — Ayub Maye
(74) *Attorney, Agent, or Firm* — McGinn I.P Law Group, PLLC.

(57) ABSTRACT

A vehicle body manufacturing apparatus includes: a jig that holds one work of the vehicle body, positions the one work to the another work, and joins the works together at a joint section; a welding gun that welds a weld portion in the joint section by an electrode that is moved along a pressure axis and pressed against the weld portion; and a welding position fixing member that regulates the pressure axis, along which the electrode is moved, within a setting area, the welding position fixing member being movable in a coaxial direction to the pressure axis along which the electrode is moved, being contactable with the joint section to interpose the joint section between the jig and the welding position fixing member, and having a controllable pressure at a time of welding the weld portion by the electrode, which is moved at the time of welding.

15 Claims, 4 Drawing Sheets

(51) Int. Cl.
  *B23K 11/36*    (2006.01)
  *B23K 11/00*    (2006.01)
  *B23K 11/11*    (2006.01)
  *B23K 37/04*    (2006.01)
  *B23K 101/00*   (2006.01)
  *B23K 101/18*   (2006.01)
  *B23K 103/04*   (2006.01)

(52) U.S. Cl.
  CPC ........ *B23K 11/364* (2013.01); *B23K 37/0435* (2013.01); *B23K 2201/006* (2013.01); *B23K 2201/18* (2013.01); *B23K 2203/04* (2013.01)

(58) Field of Classification Search
  USPC .. 219/86.1, 86.22, 86.31, 86.51, 86.61, 86.7
  See application file for complete search history.

(56) References Cited

U.S. PATENT DOCUMENTS

| | | | | |
|---|---|---|---|---|
| 6,344,629 B1 * | 2/2002 | Kato | ...................... | B62D 65/02 218/147 |
| 6,467,675 B1 * | 10/2002 | Ozaku | .................... | B62D 65/00 228/175 |
| 8,993,918 B2 * | 3/2015 | Sakai | ..................... | B23K 11/115 219/161 |
| 9,040,866 B2 * | 5/2015 | Tanaka | .................. | B23K 11/115 219/86.25 |
| 9,108,265 B2 * | 8/2015 | Sakai | ..................... | B23K 11/115 |
| 9,186,747 B2 * | 11/2015 | Ogake | ................ | B23K 11/0033 |
| 2012/0074104 A1 * | 3/2012 | Goto | .................... | B23K 11/115 219/117.1 |
| 2012/0241416 A1 * | 9/2012 | Sakamoto | ............. | B23K 11/115 219/91.2 |

FOREIGN PATENT DOCUMENTS

| | | | |
|---|---|---|---|
| JP | 2000-254784 A | | 9/2000 |
| JP | 2010-017750 A | | 1/2010 |
| JP | 2013071173 A | * | 4/2013 |
| JP | 2013-094839 A | | 5/2013 |
| JP | 2013-094846 A | | 5/2013 |

* cited by examiner

VEHICLE BODY MANUFACTURING APPARATUS

CROSS-REFERENCE TO RELATED APPLICATIONS

The present application claims priority from Japanese Patent Application No. 2014-180548 filed on Sep. 4, 2014, the entire contents of which are hereby incorporated by reference.

BACKGROUND

1. Technical Field

The present disclosure relates to vehicle body manufacturing apparatuses that weld one work of a vehicle body to another work by spot welding to pre-assemble the vehicle body.

2. Related Art

There have been proposed and put into practical use various techniques for pre-assembling a vehicle body by spot welding plural works included in the vehicle body with the works positioned. For instance, Japanese Unexamined Patent Application Publication (JP-A) No. 2-14984 discloses a technique for assembling a vehicle body, in which by the operation of each of positioning robots in a main body assembling apparatus, a work receiving jig and a work receiving surface are disposed at predetermined positions and works are positioned relative to each other, then these works are fixed by the operation of each of clamping mechanisms, and interposed and fixed between the work receiving electrode and the electrode tip of a welding robot to be spot welded.

However, when clamping, positioning, fixing of each work by a positioning robot and clamping, positioning, fixing of each work by a welding robot are independently performed as in the above-described technique for assembling a vehicle body disclosed in JP-A No. 2-14984, the clamping, positioning, fixing of each work may not be maintained with high precision in a comprehensive manner. In addition to clamping and fixing function of the welding robot, clamping mechanism of the positioning robot has to be provided, and thus many pieces of equipment having redundant functions have to be provided in production of vehicles. Furthermore, a working time for installing those pieces of equipment is needed, and also working space is reduced due to the pieces of equipment, thereby causing working efficiency to be reduced.

SUMMARY OF THE DISCLOSURE

The present disclosure has been made in view of the above-mentioned situation and aims to provide a vehicle body manufacturing apparatus capable of clamping, positioning, and fixing a work with high precision in a comprehensive manner using a minimum amount of equipment, thereby enabling working time to be reduced, a large working space to be assured, and working efficiency to be improved.

An aspect of the present disclosure provides a vehicle body manufacturing apparatus, by which a vehicle body is pre-assembled by welding one work of the vehicle body to another work by spot welding, the apparatus including: a jig that holds the one work of the vehicle body, positions the one work to the another work, and joins the works together at a joint section; a welding gun that welds a weld portion in the joint section by at least one electrode that is moved along a pressure axis and pressed against the weld portion; and a welding position fixing member that regulates the pressure axis, along which the electrode of the welding gun is moved, within a setting area, the welding position fixing member being movable in a coaxial direction to the pressure axis along which the electrode of the welding gun is moved, being contactable with the joint section to interpose the joint section between the jig and the welding position fixing member, and having a controllable pressure at a time of welding the weld portion by the electrode of the welding gun, which is moved at the time of welding.

BRIEF DESCRIPTION OF THE DRAWINGS

FIG. 1A illustrates an implementation in which when the vehicle body is assembled by an upper jig the right and left sides of which are formed integrally; and FIG. 1B illustrates a variation in which the vehicle body is assembled by an upper jig that is divided into right and left sides;

DETAILED DESCRIPTION

Hereinafter, an implementation of the present disclosure will be described with reference to the drawings.

Figure 1A:
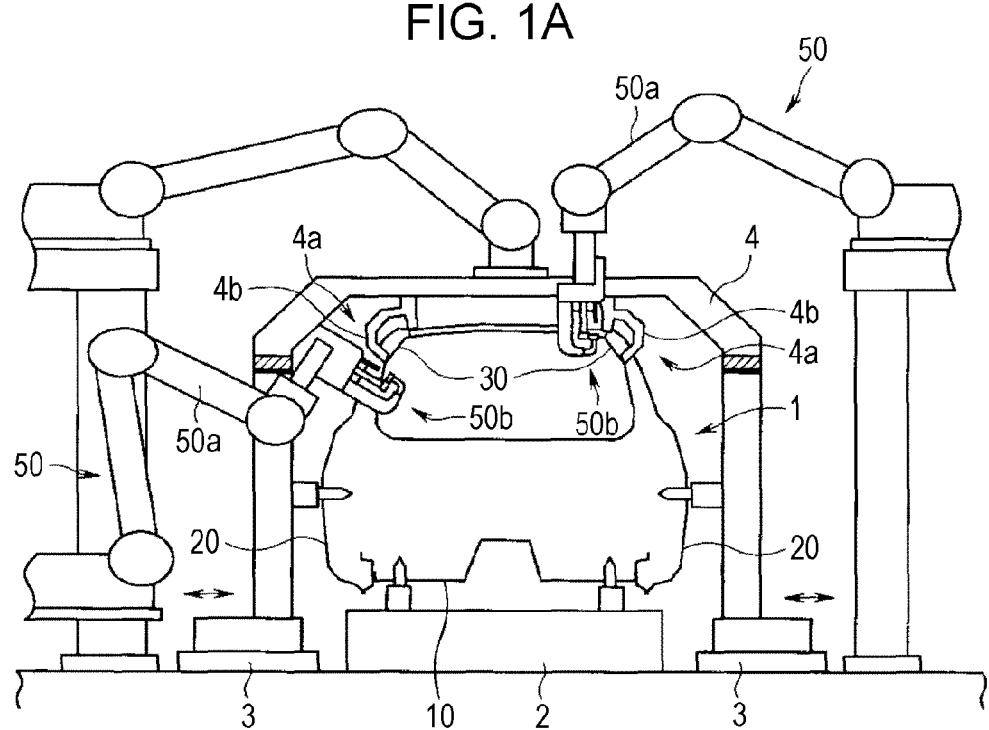
FIGS. 1A and 1B each schematically illustrate a stage of an assembly process of the main body of a vehicle, according to implementations of the present disclosure.

FIG. 1A schematically illustrates a stage of assembly line process for the main body of the frame of an automobile. In the stage of the assembly process, a vehicle body 1 is fixedly installed on an underfloor jig 2 and is transported in by a shuttle conveyer (not illustrated) or the like, the vehicle body 1 in which a side structure 20 that is a side structural part is pre-assembled and fixed to each of both sides of a center structure 10 that is a lower central structural part.

The center structure 10 includes, for instance, a front wheel apron, a toe board, a front floor, a rear floor, and a rear wheel apron. The side structure 20 includes, for instance, a front pillar, a center pillar, a rear quarter, a side rail, and a side sill.

In the stage of the assembly process, a side jig 3 is provided on the side of each of the right and left side structures 20 of the vehicle body 1, the side jig 3 being movable closer to and away from the vehicle body 1. When the vehicle body 1 is transported in as the stage proceeds from another process to the present process or when the vehicle body 1 is transported out as the stage proceeds from the present process to another process, each of the side jigs 3 moves away from the vehicle body 1.

When the vehicle body 1 is transported in the stage of the present process, and pre-assembly such as mounting, positioning, or fixing of each of works 30 is made, each side jig 3 approaches the vehicle body 1, and the position of the vehicle body 1 as well as the position of pre-assembly jig 4 are regulated so that the pre-assembly jig 4 can be guided, the pre-assembly jig 4 being used for pre-assembly of each work 30.

The works 30, which are pre-assembled in the assembly process, include, for instance, a front rail, a duct combination, a brace center, a rear rail, a rear skirt, a rear panel, and a side rail.

The pre-assembly jig 4 is guided to the transported vehicle body 1 by each side jig 3 and is capable of clamping a work of interest 30 (or regulating its movement) and positioning the work 30. The work 30 positioned by the pre-assembly jig 4 is welded and pre-assembled by a welding robot 50.

Figure 2:
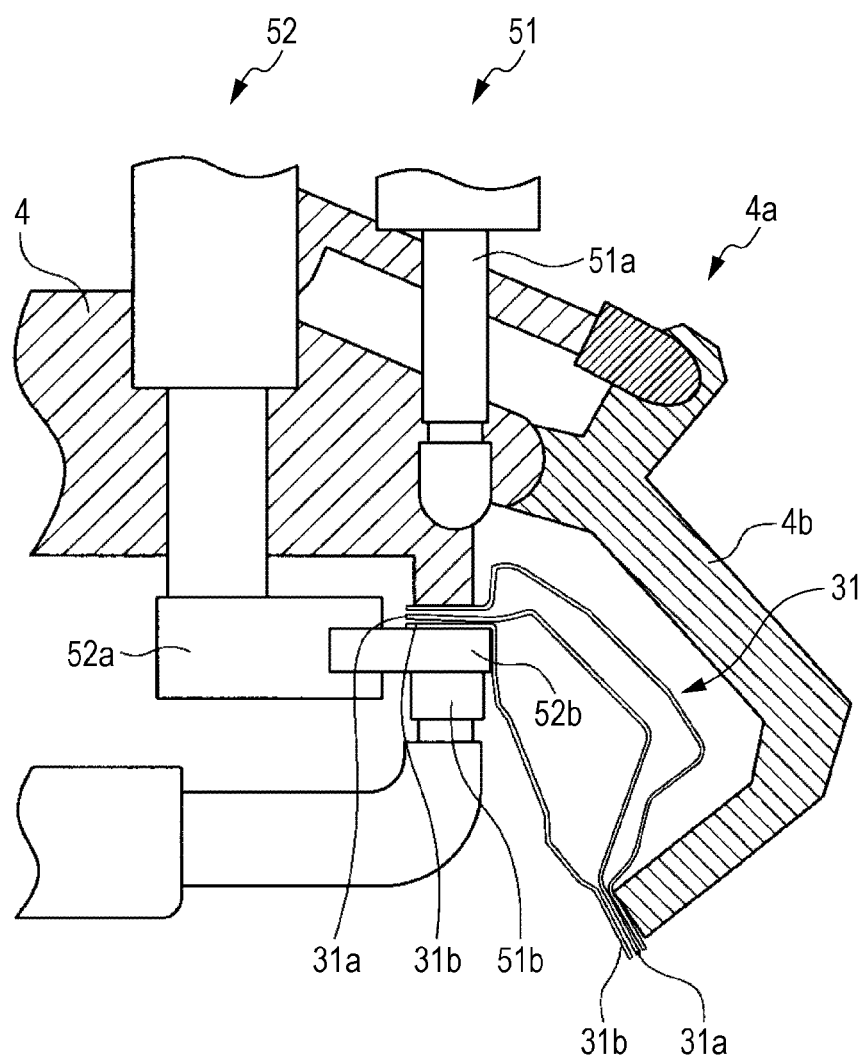
FIG. 2 illustrates an enlargement of a section where a work is fixed and welded by the upper jig and a welding position fixing member according to the implementation of the present disclosure.

In the implementation of the present disclosure, an upper jig is employed as an example of the pre-assembly jig 4 to pre-assemble each of flanges 31a of a side rail 31 that serves as the work 30 in a corresponding one of roof joint sections 31b (see FIG. 2).

Specifically, referring to FIG. 1A, the upper jig 4 is formed so as to straddle the vehicle body 1 in a long range in a vehicle width direction, both ends of the upper jig 4 bend down outwardly of the vehicle body 1 and each of the ends is fixed to the upper end of a corresponding one of the side jigs 3 that regulate the positions of the right and left side structures 20 of the vehicle body 1.

The upper jig 4 is provided with a pressing mechanism 4a that presses each flange 31a of the side rail 31 down to a corresponding roof joint section 31b and positions the flange 31a at the position of the side rail 31 on each of the right and left of the vehicle body 1. From the lateral side of the pressing mechanism 4a, a rotatable rotor 4b extends in the vehicle width direction, the rotor 4b having a sectional shape that covers the outline of the side rail 31 without contact.

At substantially the same time when the lower end of each pressing mechanism 4a of the upper jig 4 presses the corresponding flange 31a (on the side of the upper surface of the roof) over the side rail 31, the rotor 4b is rotated downward (toward the side of the roof) to press the lower flange 31a of the side rail 31, and thus the upper and lower flanges 31a of the side rail 31 may be pressed and positioned to the respective roof joint sections 31b (see FIG. 2). That is, in the present implementation, the upper and lower flanges 31a of the side rail 31 and the roof joint sections 31b are positioned to each other and an area of contact is a joint section.

The welding robot 50 includes a welding gun 51 and a sub-pressure plate 52 that serves as the welding position fixing member of the appended claims in the implementation, at an end 50b of an arm 50a that is movable with respect to the vehicle body 1.

Figure 3:
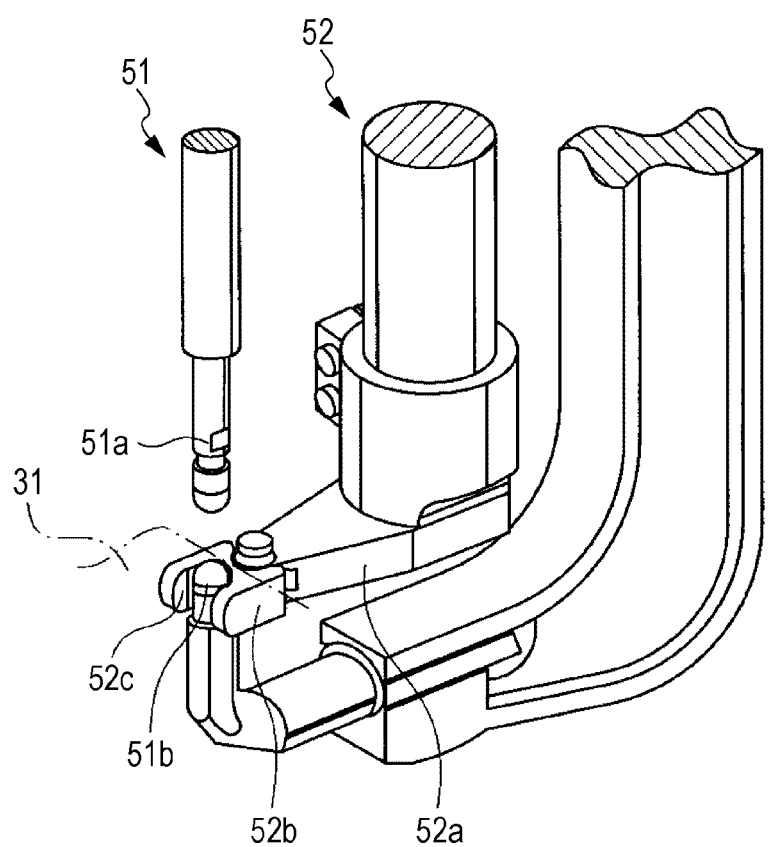
FIG. 3 is a perspective view illustrating a welding gun and the welding position fixing member according to the implementation of the present disclosure.

As illustrated in FIGS. 2 and 3, the welding gun 51 performs spot welding on what is called interstitial free (IF) steel, and includes a movable side electrode 51a and a fixed side electrode 51b, the movable side electrode 51a being movable along a pressure axis defined at the end 50b of the arm 50a, the fixed side electrode 51b being opposed to the movable side electrode 51a and fixed on the pressure axis of the movable side electrode 51a to clamp a welding section together with movement of the movable side electrode 51a and to perform spot welding with a predetermined pressure force.

The sub-pressure plate 52 is provided movably in a coaxial direction to the movement of the movable side electrode 51a of the welding gun 51. The pressure axis of the movable side electrode 51a of the welding gun 51 and the movement axis of the sub-pressure plate 52 are both provided at predetermined positions of the end 50b of the arm 50a, thereby regulating the movable position of the movable side electrode 51a and the movable position of the sub-pressure plate 52.

An end of the sub-pressure plate 52 bends and extends toward the fixed side electrode 51b of the welding gun 51, and mainly includes a first sub-pressure plate 52a and a second sub-pressure plate 52b, the first sub-pressure plate 52a being on the side of the movement axis of the sub-pressure plate 52, the second sub-pressure plate 52b being in contact with a joint section to be welded to press the joint section by the movement of the sub-pressure plate 52.

The second sub-pressure plate 52b is rotatably provided at the end of the first sub-pressure plate 52a so as to face the fixed side electrode 51b, and a portion of the second sub-pressure plate 52b facing the fixed side electrode 51b has a semicircle notch 52c so as to avoid contact with the fixed side electrode 51b.

Figure 4:
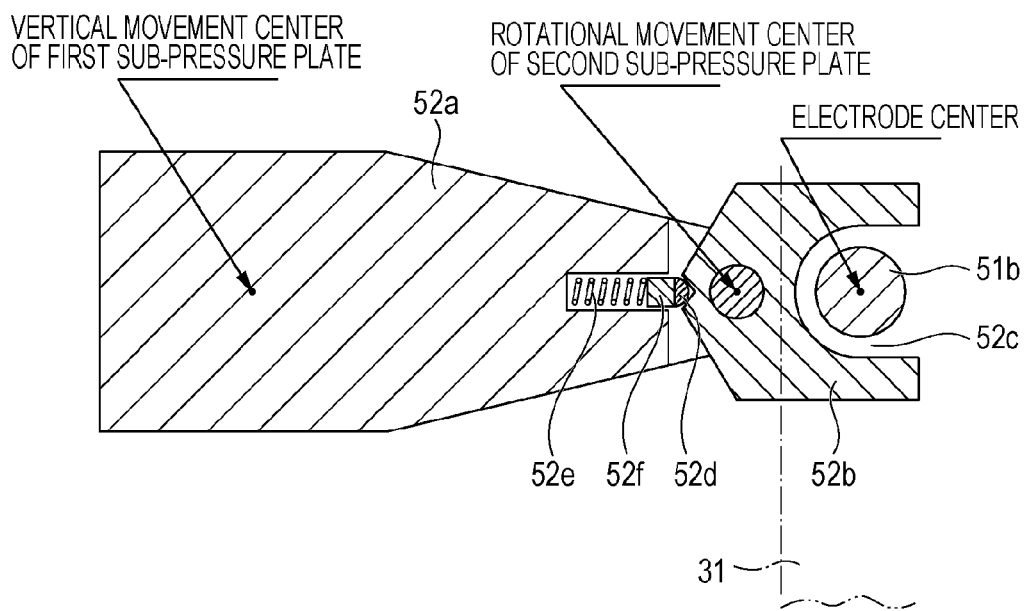
FIG. 4 is a sectional view illustrating the structure of the welding position fixing member according to the implementation of the present disclosure.

As illustrated in FIG. 4, a V-shaped groove 52d is formed at an opposite end of the second sub-pressure plate 52b from the notch 52c, so as to face o the first sub-pressure plate 52a. The first sub-pressure plate 52a is provided with a spring 52e that constantly urges outwardly and a pin 52f that is urged by the spring 52e. The end of the pin 52f is engaged with the V-shaped groove 52d of the second sub-pressure plate 52b, thereby urging rotation of the second sub-pressure plate 52b in a direction in which the center of the notch 52c and the center of the fixed side electrode 51b are aligned.

Next, an example will be described where the upper and lower flanges 31a of the side rail 31 and the roof joint sections 31b are positioned to each other and pre-assembled by spot welding in the above-described stage of the assembly process.

First, when the vehicle body 1 is fixedly installed on the underfloor jig 2 and is transported in by a shuttle conveyer (not illustrated) or the like and is stopped, each side jig 3 approaches the vehicle body 1.

Then, the upper jig 4 is supported and guided by the side jig 3, and the pressing mechanism 4a of the upper jig 4, along with the operation of the rotor 4b, presses the upper and lower flanges 31a of the side rail 31 to be positioned to the respective roof joint sections 31b.

Subsequently, the arm 50a of the welding robot 50 approaches the vehicle body 1, and causes the end 50b to approach the joint section (a joint surface between the flange 31a of the side rail 31 and the roof joint section 31b) from the inside of the vehicle body 1 or from the outside of the vehicle body 1.

Next, the sub-pressure plate 52 of the end 50b of the arm 50a is extended to position the second sub-pressure plate 52b of the sub-pressure plate 52 to the fixed side electrode 51b on the side of the joint section (on the side of the roof joint section 31b) which is opposite to a joint section pressed by the pressing mechanism 4a of the upper jig 4 such that the center of the notch 52c and the center of the fixed side electrode 51b are aligned.

Subsequently, the sub-pressure plate 52 is contracted in this state, and the second sub-pressure plate 52b is caused to come into contact with the roof joint section 31b, and further predetermined contraction causes the joint section to be interposed and positioned between the pressing mechanism 4a of the upper jig 4 and the sub-pressure plate 52.

The movable side electrode 51a of the welding gun 51 is then moved from the flange 31a of the side rail 31 to the fixed side electrode 51b, and a predetermined pressure is applied to perform spot welding, the fixed side electrode 51b being positioned at the center of the notch 52c of the second sub-pressure plate 52b and being in contact with the joint section along with the second sub-pressure plate 52b.

After the spot welding by the welding gun 51 is completed, the sub-pressure plate 52 is extended and the second sub-pressure plate 52b is moved away from the joint section, and the end 50b of the arm 50a along with the welding gun 51 and the sub-pressure plate 52 moves to another joint section to perform spot welding in similar steps.

After needed welding is performed, the upper jig 4 is moved away to release the positioning by the upper jig 4, and pre-assembly is performed using another jig (not illustrated).

Subsequently, the side jig 3 is moved away from the vehicle body 1, and the vehicle body 1 is transported out to another process by a shuttle conveyor or the like while fixedly installed on the underfloor jig 2.

As described above, in the implementation of the present disclosure, there is provided the sub-pressure plate 52 which regulates the pressure axis of the welding gun 51 within a setting area, the welding gun 51 having the movable side electrode 51a to be moved along the pressure axis and the fixed side electrode 51b, the sub-pressure plate 52 being movable in the coaxial direction to the pressure axis along which the movable side electrode 51a of the welding gun 51 is moved, being contactable with the joint section to interpose and position the joint section between the jig 4 and the sub-pressure plate 52, and having a controllable pressure for welding a weld portion by the movable side electrode 51a of the welding gun 51, which is moved when welding is performed. Therefore, clamping, positioning, fixing of each work is not performed independently but performed by the jig 4 and the sub-pressure plate 52, and thus those operations desirably performed in pre-assembly may be performed with high precision in a comprehensive manner, thereby enabling working time to be reduced, a large working space to be assured, and working efficiency to be improved.

Figure 1B:
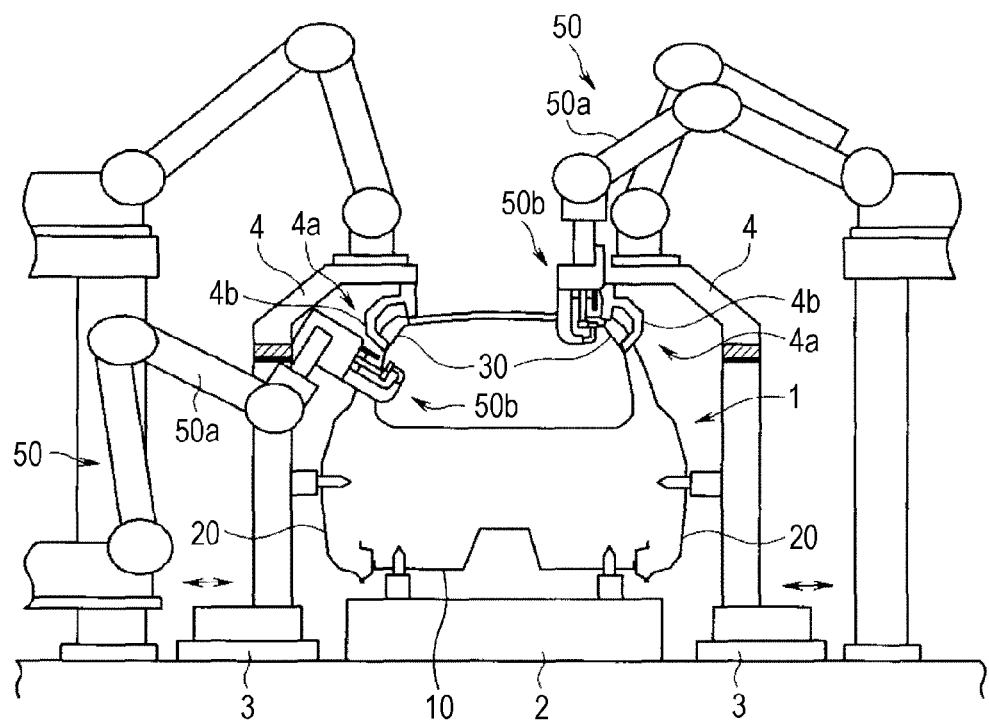

In the implementation of the present disclosure, a vehicle body is assembled by the upper jig the right and left sides of which are formed integrally as illustrated in FIG. 1A, but the present disclosure is not limited to this. The present disclosure is applicable to the case where a vehicle body is assembled by an upper jig that is divided into right and left sides as illustrated in FIG. 1B. The present disclosure is also applicable to the case where pre-assembly is performed using another jig other than the upper jig 4. While pre-assembly of the side rail 31 is performed as an example in the present implementation, the present disclosure is also applicable to pre-assembly of another component.

The invention claimed is:

1. A vehicle body manufacturing apparatus temporary to assemble a vehicle body by welding a first work of the vehicle body to a second work by spot the vehicle body manufacturing apparatus comprising:
    a jig to hold the first work of the vehicle body and to position, the first work to die second work, the first work being on the second work at a joint section;
    a welding gun to weld a weld portion in the joint section by at least one electrode that is moved along a pressure axis and pressed against the weld portion; and
    a welding position fixing member to fix a position of the pressure axis along which the at least one electrode of the welding gun is moved,
    wherein the jig and the welding position fixing member are configured to directly and simultaneously clamp the first and second works at the joint section between the jig and the welding position fixing member by tire welding position fixing member moving toward the jig in the coaxial direction of the pressure axis, and wherein the welding gun and the welding position fixing member are attached to an arm movable with respect to the vehicle body and operating independently of the jig.

2. The apparatus for manufacturing a vehicle body according to claim 1, wherein
    the at least one electrode comprises a fixed side electrode, and
    a portion of the welding position fixing member, the portion being in contact with the joint section, is provided near the fixed side electrode of the welding gun, and is in contact with a surface of the joint section, the surface being opposed to the fixed side electrode.

3. The apparatus for manufacturing a vehicle body according to claim 1, wherein the jig comprises an upper jig that makes a joint at an upper portion of the vehicle body.

4. The apparatus for manufacturing a vehicle body according to claim 1, wherein a portion of the jig contacts the first work of the vehicle body.

5. The apparatus for manufacturing a vehicle body according to claim 1, wherein a portion of the jig contacts the first work of the vehicle body simultaneously with the welding position fixing member as the welding gun welds the weld portion.

6. The apparatus for manufacturing a vehicle body according to claim 1, wherein the jig independently contacts the first work of the vehicle body at a different location of the first work than where the welding position fixing member contacts the first work.

7. The apparatus for manufacturing a vehicle body according to claim 1, wherein the jig contacts the first work of the vehicle body at a different location of the first work than a location of the weld portion.

8. The apparatus for manufacturing a vehicle body according to claim 1, wherein holding, positioning, and fixing of the first work of the vehicle body is jointly performed by the jig and the welding position fixing member.

9. The apparatus for manufacturing a vehicle body according to claim 1, wherein the jig holds the first work and the second work prior to the jig and the welding position fixing member clamping the first and second works at the joint section.

10. The apparatus for manufacturing a vehicle body according to claim 1, wherein the welding position fixing member comprises a sub-pressure plate.

11. The apparatus for manufacturing a vehicle body according to claim 1, wherein the jig and the welding gun concurrently clamps, positions, and fixes the first and second works.

12. The apparatus for manufacturing a vehicle body according to claim 10, wherein the jig and the sub-pressure plate concurrently clamps, positions, and fixes the first and second works.

13. The apparatus for manufacturing a vehicle body according to claim 2, wherein a portion of the welding position fixing member, the portion being in contact with the joint section, is extended from a movement axis of the welding position fixing member toward the fixed side electrode of the welding gun, and is rotatably provided.

14. The apparatus for manufacturing a vehicle body according to claim 2, wherein the jig comprises an upper jig that makes a joint at an upper portion of the vehicle body.

15. The apparatus for manufacturing a vehicle body according to claim 13, wherein the jig comprises an upper jig that makes a joint at an upper portion of the vehicle body.

* * * * *